United States Patent [19]
Bae et al.

[11] Patent Number: 5,225,108
[45] Date of Patent: Jul. 6, 1993

[54] POLYMER STABILIZER AND POLYMER COMPOSITION STABILILZED THEREWITH

[75] Inventors: Kook-Jin Bae, East Northport, N.Y.; Curtis R. Martin, Butler, N.J.

[73] Assignee: Witco Corporation, New York, N.Y.

[21] Appl. No.: 722,350

[22] Filed: Jun. 27, 1991

Related U.S. Application Data

[63] Continuation of Ser. No. 525,443, May 18, 1990, Pat. No. 5,034,443.

[51] Int. Cl.$^5$ .............................................. C09K 15/02
[52] U.S. Cl. .................................................. 252/400.3
[58] Field of Search ............... 524/180, 181, 493, 399, 524/567; 252/400.3

[56] References Cited

U.S. PATENT DOCUMENTS

| | | | |
|---|---|---|---|
| 4,221,687 | 9/1980 | Minagawa et al. | 524/357 |
| 4,675,356 | 6/1987 | Miyata | 524/436 |
| 4,751,261 | 6/1988 | Miyata et al. | 524/357 |
| 4,861,816 | 8/1989 | Kobayashi et al. | 524/204 |
| 4,861,816 | 8/1989 | Kobayashi et al. | 524/204 |
| 4,950,704 | 8/1990 | Croce et al. | 524/357 |
| 4,957,954 | 9/1990 | Iizuka et al. | 524/436 |

FOREIGN PATENT DOCUMENTS

| | | |
|---|---|---|
| 52-77158 | 6/1977 | Japan . |
| 53-11948 | 2/1978 | Japan . |
| 53-13659 | 2/1978 | Japan . |
| 63-63724 | 3/1988 | Japan . |
| 7513344 | 5/1976 | Netherlands . |
| 1588405 | 4/1981 | United Kingdom . |

OTHER PUBLICATIONS

CA 89:25386f.

Primary Examiner—Veronica P. Hoke
Attorney, Agent, or Firm—Lockwood, Alex, FitzGibbon & Cummings

[57] ABSTRACT

Stabilizer compositions including blends of sodium perchlorate hydrate and calcium silicate are disclosed. Free flowing powder compositions of reduced hazard level including calcium silicate, non-absorbing diluent powder such as calcium carbonate, and a solution of sodium perchlorate in water are also disclosed. Vinyl halide compositions especially those used for motor vehicle components having improved long term stability at moderate aging temperatures of about 180° F. to about 275° F., and processes for preparing such compositions, are also disclosed.

7 Claims, No Drawings

POLYMER STABILIZER AND POLYMER COMPOSITION STABILILZED THEREWITH

This is a continuation of application Ser. No. 525,443, filed May 18, 1990 now U.S. Pat. No. 5,034,443 issued Jul. 23, 1991.

BACKGROUND OF THE INVENTION

The present invention relates to stabilizer compositions for polyvinyl chloride resins and to polyvinyl chloride resin compositions having improved resistance to degradation caused by heat. More particularly, the present invention relates to improved sodium perchlorate stabilizer compositions and their use in polyvinyl chloride resin compositions. Although capable of a variety of uses, this invention finds advantageously utility in providing improved long term stability at moderate temperatures to motor vehicle components shaped from polyvinyl chloride resin compositions, especially where the polyvinyl chloride resin compositions are used in combination with urethane.

The problem of imparting to polyvinyl chloride a sufficient heat processing stability at temperatures in which the polymer becomes sufficiently fluid or softened to permit shaping is of course of long standing, and has been satisfactorily resolved by addition to the polymer of various combinations of known heat stabilizers. At these temperatures, the resin can degrade, liberating hydrogen chloride, and discolor, become brittle, and stick to the equipment. These problems are overcome by combining with the polymer before heat processing or during heat processing one or more of the well established and successful conventional heat stabilizers, such as, for example, the well known organotin stabilizers and/or barium-cadmium or barium-zinc salt stabilizers.

Although the well established and successful conventional heat stabilizers provide effective stabilization to the polymer at elevated heat processing temperatures during standard processing, they may not provide effective stabilization to the polymer at lower more moderate temperatures after such heat processing. For example, protection against discoloration at moderate temperatures over long periods is a particular problem with motor vehicle components shaped from polyvinyl chloride resin compositions despite such compositions having contained conventional heat stabilizers during their heat processing. Depending upon their location in the vehicle, these components may be exposed to varied amounts of light, and also different rather high (above atmospheric) temperatures in use, and these differences can degrade motor vehicle components at differing rates. Additionally, when polyvinyl chloride resin compositions are associated with a polyurethane foam backing, e.g. automobile instrument panels, glove compartments, door handles, arm and head rests, the amine from the urethane can contribute to discoloration of the polyvinyl chloride resin composition.

A number of stabilizing systems have been proposed for imparting polyvinyl chloride resin articles molded with a polyurethane foam backing with resistance to deterioration from exposure to long term moderate heat and from exposure to an amine from urethane. For example, the art has recognized the use of perchlorate salts in polyvinyl chloride resin stabilization and in particular in stabilizing polyvinyl chloride that is used in contact with polyurethane foam or plastic. European Patent Application No. 86111174.8 discloses polyvinyl chloride resin stabilizer compositions comprising a 2, 2, 6, 6-tetramethyl piperidinyl compound and an ammonium or metal perchlorate. This publication also discloses the use of such stabilizer compositions for polyvinyl chloride resin articles molded with polyurethane foam backing.

U.S. Pat. No. 4,861,816 discloses polyvinyl chloride compositions containing a stabilizer mixture of certain barium/zinc carboxylic acid salts and a metal perchlorate and/or perchlorate ion type hydrotalcite. According to the '816 patent the perchlorate and perchlorate ion type hydrotalcite compound give excellent amine resistance particularly to urethane attached polyvinyl chloride sheets.

Perchlorates, however, are dangerous oxidizing materials and great care is needed in using them safely. Due to this hazard there may exist some reluctance in the industry to utilize perchlorate salts for polyvinyl chloride resin stabilization. Accordingly, there exists a need for a perchlorate stabilizer composition of reduced hazard level. Additionally, there exists a need for improved perchlorate salt stabilizer compositions for polyvinyl chloride resin compositions exposed to long term, above ambient temperatures, especially when such compositions are in contact with urethane.

Accordingly, a general object of the present invention is to provide an improved perchlorate salt stabilizer composition.

It is another object of the present invention to provide a perchlorate salt stabilizer composition of reduced hazard level.

It is another object of the present invention to provide a method of stabilizing halogen-containing organic or polymer resin compositions particularly those in contact with urethane, against long term above-ambient temperature degradation.

It is a further object of the present invention to provide novel stabilized halogen-containing polymers.

It is a further object of the present invention to provide shaped motor vehicle components having an improved stability at moderate temperatures.

These and other objects of the present invention will be apparent to those skilled in the art from the following description.

SUMMARY OF THE INVENTION

It has now been found that a blend of sodium perchlorate hydrate and calcium silicate provides improved long term heat stability to a polyvinyl chloride resin containing a conventional heat stabilizer. Additionally, it has been found that a combination of a solution of sodium perchlorate in water with calcium silicate and a non-absorbing diluent powder such as calcium carbonate provides a free-flowing powder composition of reduced hazard level. Improved resistance to deterioration of motor vehicle components made of polyvinyl chloride resin compositions is obtained by combining with the polyvinyl chloride resin at least one conventional heat stabilizer and a mixture of sodium perchlorate and calcium silicate in a sufficient amount to provide, after formation of a motor vehicle component, resistance to deterioration at moderate temperatures.

DETAILED DESCRIPTION OF THE INVENTION

The polymers or resins which may be stabilized by practice of this invention may be halogen-containing organic polymers typically those which contain chlorine atoms bonded to the polymer chain. These polymers may be homopolymers including polyvinyl chloride-type polymers, e.g. polyvinyl chloride. These polymers may also include copolymers formed by the copolymerization of vinyl chloride with other ethylenically unsaturated monomers. Ethylenically unsaturated monomers may be compounds which contain polymerizable carbon-to-carbon double bonds and may include alpha olefins such as ethylene, propylene and 1-hexene; acrylates, such as acrylic acid, ethyl acrylate, acrylonitrile; vinyl monomers, such as styrene, vinyl acetate; and/or maleates, such as maleic acid, maleic anhydride, maleic esters. For convenience, reference will be hereinafter made to vinyl chloride polymers.

The stabilizer combinations of this invention have applicability to both unplasticized or rigid polyvinyl chloride resins as well as plasticized polyvinyl chloride resins. The present invention has particular applicability to those polyvinyl resins used in association with urethane products including, but not limited to, polyurethane foams and plastics. The rigid polyvinyl chloride resins are defined as those containing at most about 10 percent plasticizer. Plasticized resins contain at least 10 percent plasticizer and can contain as much as 50 to 60 percent plasticizer according to the degree of plasticization desired. When plasticizers are to be employed, they may be incorporated into polyvinyl resins using conventional means. Conventional plasticizers can be used, such as dioctylphthalate, dioctylsebacate and tricresyl phosphate. Additionally, it is possible to use epoxy plasticizers, polyester plasticizers, etc.

The vinyl chloride polymers may also include other conventional additives and ingredients. These additives and ingredients include, but are not limited to, impact modifiers, pigments and/or fillers, lubricants, etc.

The preparation of the stabilized polymer composition is accomplished by conventional procedures. The selected stabilizer combination along with the desired compound and ingredients such as colors, lubricants, antistatic agents, etc. as may be needed, is blended with the polymer being stabilized, using, for instance, plastic mixing rollers at a temperature at which the mix is fluid and thorough blending facilitated, typically at from 120° to 180° C. for time sufficient to form a homogeneous sheet, 5 minutes, usually. After the mass is formed, it is sheeted off in the usual way.

A sufficient amount of a conventional heat stabilizer or of a combination of conventional heat stabilizers is used to provide resistance to the polyvinyl resin from deterioration and physical properties during heat processing, including, for example, discoloration, reduction in melt viscosity and embrittlement. The conventional heat stabilizers include, but are not limited to conventional organo metallic stabilizers such as the known organotin mercaptides, organotin sulfides and organotin carboxylates and mixtures thereof, and the known metal salts stabilizers such as barium salts, cadmium salts, zinc salts and mixtures thereof. The conventional stabilizers are normally used in an amount of 0.01 to 10 percent by weight of the resin and more preferably the conventional stabilizers are used in an amount of 0.1 to 5 percent by weight of the resin.

Specific examples of useful organotin stabilizers include alkyl mercaptides such as monomethyltin tris (isooctylthioglycolate), dimethyltin bis (isooctylthioglycolate), monomethyltin tris (2-ethylhexylthioglycolate), dimethyltin bis (2-ethylhexylthioglycolate), monobutyltin tris (isooctylthioglycolate), dibutyltin bis (isooctylthioglycolate), monobutyltin tris (2-ethylhexylthioglycolate), dibutyltin bis (2-ethylhexylthioglycolate), monomethyltin tris (mercaptoethyltallate), dimethyltin bis (mercaptoethyltallate), dibutyltin bis (mercaptoethyltallate), monobutyltin tris (mercaptoethyllaurate), dibutyltin bis (mercaptoethyllaurate), monomethyltin bis (isooctyl 3-mercaptopropionate), dimethyltin bis (isooctyl 3-mercaptopropionate), monobutyltin tris (isooctyl 3-mercaptopropionate), dibutyltin bis (isooctyl 3-mercaptopropionate), etc.; alkyltin sulfides such as monomethyltin sulfide, dimethyltin sulfide, monobutyltin sulfide, dibutyltin sulfide, etc.; alkyltin carboxylates such as dimethyltin dilaurate, dibutyltin dilaurate, dibutyltin dioctanoate, dibutyltin didecanoate, dibutyltin neodecanoate, dibutyltin dilaurate, dibutyltin ditallate, dioctyltin maleate, dibutyltin bis (dodecyl maleate), etc.; and mixtures thereof.

Specific examples of useful metal salt stabilizers include barium di(nonylphenolate), barium di(nonyl-o-cresolate), barium laurate, barium ricinoleate, barium myristate, barium benzoate, barium oxalate, barium malonate, barium maleate, barium tartrate, barium p-tert-butylbenzoate, barium succinate, barium glutarate, barium adipate, barium pimelate, barium suberate, barium azelate, barium sebacate, etc., cadmium-2-ethylhexoate, cadmium laurate, cadmium stearate, cadmium naphthenate, cadmium benzoate, cadmium epoxystearate, cadmium myristate, cadmium p tert-butylbenzoate, zinc laurate, zinc oxalate, zinc malonate, zinc maleate, zinc tartrate, zinc benzoate, zinc p-tertbutylbenzoate, zinc succinate, zinc adipate, zinc malate, zinc stearate, etc. Additionally, mixtures of the foregoing and/or other known metal salt stabilizers can be used. For example, a 99:1 by weight ratio blend of barium benzoate and zinc laurate has been found useful as has a 6:1 by weight blend of barium stearate and zinc laurate.

In addition to the conventional heat stabilizers, there can also be added conventional antioxidants such as phenolic antioxidants normally used in an amount of 0.01–10 percent, and more typically in an amount of 0.1 to 5 percent by weight of the weight of the conventional heat stabilizer. Additionally, conventional epoxy compounds such as epoxidized soy bean oil can be used in amounts of 0.01–10 percent by weight of the polymer.

In accordance with the present invention, in addition to the conventional heat stabilizer(s) and additives, a sufficient amount of a composition comprising sodium perchlorate hydrate and calcium silicate is used to improve the resistance of the synthetic polymer to deterioration and physical properties from long term moderate heat exposure such as that experienced by motor vehicle components in use.

The sodium perchlorate/calcium silicate stabilizer composition can be prepared by combining a solution of sodium perchlorate in water (approximately 60 percent or greater by weight sodium perchlorate) such as that commercially available from Kerr-McGee Chemical Corporation, with calcium silicate such as the synthetic amorphous calcium silicate sold by the J. M. Huber Corporation under the trade designation Hubersorb 600 which has an average particle size according to the Coulter counter method of approximately 3.2 micrometers. It has been found that calcium silicate when used in combination with the sodium perchlorate solution not only provides improved long term heat stability compared to comparable use of sodium perchlorate alone, but also is able to absorb the water in the sodium perchlorate solution and provide a sodium perchlorate stabilizer composition which is relatively easy to handle and of reduced hazard level. Preferably, the sodium perchlorate/calcium silicate combination also contains a non-absorbing diluent powder such as calcium carbonate to improve the compositions flowability. In this regard, calcium carbonate commercially available by Thomson Weinman Company under the trade name Atomite has been used. Other non-absorbing diluent powders include zeolites, silica, alumina, PVC resins, barium sulfate, and the like.

The sodium perchlorate/calcium silicate compositions of the present invention in general include 10 to 30 percent by weight of 60 percent aqueous sodium perchlorate monohydrate, 30 to 50 percent by weight of calcium silicate, and 30 to 50 percent by weight of calcium carbonate. Preferably, the sodium perchlorate/calcium silicate compositions include 15 to 25 percent sodium perchlorate monohydrate, 35 to 45 percent by weight calcium silicate and 30 to 50 percent by weight calcium carbonate. Free flowing powder compositions have been prepared by combining 25 percent by weight of 60 percent aqueous sodium perchlorate monohydrate, 40 percent by weight of calcium silicate and 45 percent by weight of calcium carbonate; and 15 percent by weight of 60 percent aqueous sodium perchlorate monohydrate and 40 percent calcium silicate and 45 percent calcium carbonate.

As noted, in practice, the sodium perchlorate/calcium silicate compositions are utilized in combination with a conventional heat stabilizer. In this regard, in accordance with the reduced hazard level aspect of the present invention, care should be exercised by the user to avoid potentially dangerous situations such as combining or otherwise contacting the perchlorate compositions with readily oxidizable compositions. Accordingly, from a reduced hazard level aspect, conventional stabilizers susceptible to ready oxidation such as organic phosphites are not recommended for use with perchlorate compositions. The amount of the sodium perchlorate/calcium silicate composition used in the present invention is preferably from 0.1 to 10 parts, and more preferably from 0.5 to 5 parts by weight of the weight of the polyvinyl chloride resin.

The stabilizer systems of the invention including conventional heat stabilizers and sodium perchlorate/calcium silicate long term heat stabilizers can be compounded with polyvinyl chloride resins, properly formulated, and shaped by standard plastics processing techniques (including calendering, extrusion, injection and compression molding, blow molding, rotational molding, slush and dip molding, solution casting, electrostatic spray and fluidized bed coating), to form a wide variety of motor vehicle components for both interior and exterior use, such as dashboards, seat coverings, floor mats, door panels, arm and headrests, receptacles, compartments, bodyside moldings, window trim moldings, seat corners and headliners, door and window knobs and crash dashboards.

Compounding components such as plasticizers, lubricants, impact modifiers, processing aids, fillers, colorants, antistatic agents, tackfiers, flame retardants, fungicides, antiblocking agents, etc. can be incorporated to facilitate the processing of such motor vehicle components.

The following examples demonstrate the usefulness of the present invention.

EXAMPLES 1-8

Polyvinyl chloride resin compositions were prepared having the following base formulation:

| INGREDIENT | PARTS BY WEIGHT |
| --- | --- |
| Polyvinyl chloride homopolymer (OXY B-282) | 100.0 |
| Diundecyl Phthalate (Exxon) | 40.0 |
| Diisodecyl Phthalate (Exxon) | 15.00 |
| Epoxidized Soy Bean Oil (Drapex 6.8) | 7.0 |
| Primary Heat Processing Stabilizer (composition of approximately 60% weight percent barium stearate, 10 weight percent zinc laurate, 10 weight percent di-trimethylolpropane, 10 weight percent dibenzoylmethane, 8 weight percent calcium carbonate, and 2 weight percent 1,1,3-tris(2-methyl-4-hydroxy-5-t-butylphenyl) butane) | 2.5 |

Depending upon the example, the following components were added to the base formulation:

| EXAMPLE | PARTS BY WEIGHT ADDITION TO BASE FORMULATION |
| --- | --- |
| 1 | None |
| 2 | 0.1 parts calcium silicate (Hubersorb 600) |
| 3 | 0.3 parts calcium silicate (Hubersorb 600) |
| 4 | 0.5 parts calcium silicate (Hubersorb 600) |
| 5 | 0.1 parts 60% NaClO₄ aqueous solution (Kerr-McGee) |
| 6 | 0.2 parts 60% NaClO₄ aqueous solution (Kerr-McGee) |
| 7 | 0.3 parts calcium silicate (Hubersorb 600) 0.1 parts 60% NaClO₄ aqueous solution (Kerr-McGee) |
| 8 | 0.5 parts calcium silicate (Hubersorb 600) 0.2 parts 60% NaClO₄ aqueous solution (Kerr-McGee) |

The formulations of Examples 1-8, were blended on a two-roll mill, and then sheeted off.

To determine heat processing stability, samples of Examples 1-8 were cut from the sheets and heated in an oven at 350° F. and at 375° F. for up to two hours. Samples were withdrawn at fifteen minute intervals to follow the progress of any deterioration, as evidenced by visual discoloration and/or embrittlement.

The samples of Examples 1-8 were tested for long term heat stability at moderate temperatures. Samples of Examples 1-8 were placed in contact with foamed polyurethane and exposed at 250° F. in an oven for up to nineteen days. Samples were withdrawn at daily intervals and visually examined. Samples of Examples 1-8 were also placed on glass plates and exposed at 250° F. in an oven for up to seventeen days. Samples were withdrawn at daily intervals and visually examined.

The samples of Examples 1-8 subjected to the oven test at 350° F. showed relatively little visible difference throughout the test. At 375° F., samples from Examples 1-8 showed relatively little visible difference through thirty minutes. At forty minutes, samples from Examples 5 and 6 were visibly worse, i.e. had dark spots, than were samples from Examples 1-4 and 7-8. At fifty minutes, Examples 1, 2, 5 and 6 were visibly degraded, i.e. black; Examples 3 and 7 had dark spots like Examples 5 and 6 at forty minutes; Examples 4 and 8 had little or no degradation and were noticeably better than Examples 5 and 6 were at forty minutes. Sixty minute samples for Examples 1, 3, 4 and 8 were all badly discolored.

In the long term heat stability test wherein the polyvinyl was in contact with foamed polyurethane distinct visible differences were discernable between the control formulations, Examples 1-6, and the formulations illustrating the present invention, Examples 7-8. Base formula control Example 1 and control Example 2 containing added calcium silicate were visibly quite badly discolored by the seventh day. Control Examples 3 and 4 containing added calcium silicate performed at best marginally better than Example 1, and with each of Examples 3 and 4 being discolored by the ninth day to at least the same extent as were Examples 1 and 2 on day seven. Control Examples 5 and 6 containing added sodium perchlorate performed better than did Examples 1-4 at all comparable times through day nine. Example 5 was visibly quite badly discolored by the tenth day. By the tenth day Example 6 was somewhat better than was Example 5 but by day eleven Example 6 was visibly worse than Example 5 had been at day ten. In contrast, Examples 7 and 8, illustrating the present invention demonstrated as good if not better color through day eleven than did Examples 1-6. Furthermore, Example 7 although starting to display discernable discoloration at day twelve did not appreciably worsen from day twelve through eighteen. Example 8 performed better than did Example 7 and at day eighteen Example 8 was, at least as good if not: better than Examples 1 and 2 had been at day seven; better than Examples 3 and 4 had been at day nine; and better than Examples 5 and 6 had been at day ten.

The results of the long term heat stability without polyurethane present, were similar to the long term heat stability test in contact with polyurethane noted above for Examples 1-8. In general, added calcium silicate alone, i.e. Examples 2-4, performed worse than the base formula control, i.e. Example 1; added sodium perchlorate alone, i.e. Examples 5-6 is modestly helpful; and the present invention, i.e. Examples 7-8, is outstandingly better than the controls.

| INGREDIENT | PARTS BY WEIGHT |
| --- | --- |
| Polyvinyl chloride homopolymer (GEON 103) | 100.0 |
| Acrylic Modifier (Acryloid K175) | 1.0 |
| Acrylic Modifier (Acryloid K125) | 0.4 |
| Acrylic Impact Modifier (KM-323B) | 1.2 |
| Ethylene bis stearamide lubricant | 1.0 |
| Titanium Dioxide | 10.0 |
| Calcium Stearate | 1.2 |
| Primary Heat Processing Stabilizer (methyltin isooctylthioglycolate mixture of approximately 20% monomethyltin tris isooctylthioglycolate and 80% dimethyltin bis isooctylthioglycolate) | 1.5 |

Depending on the examples the following components were added to the base formulation:

| EXAMPLE | PARTS BY WEIGHT ADDITION TO BASE FORMULATION |
| --- | --- |
| 9 | None |
| 10 | 1.5 parts of a composition comprising 40% weight percent calcium silicate (Hubersorb 600), 45 weight percent calcium carbonate (Atomite) and 15 weight percent of 60% aqueous NaClO$_4$ solution monohydrate (Kerr-McGee) |
| 11 | 1.5 parts calcium silicate (Hubersorb 600) |
| 12 | 1.5 parts of a composition comprising 55 weight percent calcium silicate (Hubersorb 600) and 45 weight percent calcium carbonate (Atomite) |
| 13 | 1.5 parts of a composition comprising 45 weight percent calcium carbonate and 55 weight percent of 60% aqueous NaClO$_4$ solution (Kerr-McGee) |

EXAMPLES 14-18

Polyvinyl chloride resin compositions were prepared having the same base formulation as that used for Examples 9-13 except that the acrylic impact modifier (KM 323B) was present in 7 parts instead of 1.2 parts.

Depending on the example the following components were added to the base formulation:

| EXAMPLE | PARTS BY WEIGHT ADDITION TO BASE FORMULATION |
| --- | --- |
| 14 | None |
| 15 | 1.5 parts of a composition comprising 40% weight percent calcium silicate (Hubersorb 600), 45 weight percent calcium carbonate (Atomite) and 15 weight percent of 60% aqueous NaClO$_4$ solution (Kerr-McGee) |
| 16 | 3.0 parts of a composition comprising 40% weight percent calcium silicate (Hubersorb 600), 45 weight percent calcium carbonate (Atomite) and 15 weight percent of 60% aqueous NaClO$_4$ solution (Kerr-McGee) |
| 17 | 1.5 parts of a composition comprising 40 weight percent calcium silicate, 45 weight percent tetra sodium pyrophosphate and 15 weight percent of 60% aqueous NaClO$_4$ solution |
| 18 | 1.5 parts of a tetra sodium pyrophosphate |

EXAMPLES 19-24

Polyvinyl chloride resin compositions were prepared having the same base formulation as that used for Examples 9-13.

Depending on the example the following compounds were added to the base formulation:

| EXAMPLE | PARTS BY WEIGHT ADDITION TO BASE FORMULATION |
| --- | --- |
| 19 | None |

| EXAMPLE | PARTS BY WEIGHT ADDITION TO BASE FORMULATION |
|---|---|
| 20 | 0.5 parts of a composition comprising 40% weight percent calcium silicate (Hubersorb 600), 45 weight percent calcium carbonate (Atomite) and 15 weight percent of 60% aqueous NaClO$_4$ solution (Kerr-McGee) |
| 21 | 1.5 parts of a composition comprising 40% weight percent calcium silicate (Hubersorb 600), 45 weight percent calcium carbonate (Atomite) and 15 weight percent of 60% aqueous NaClO$_4$ solution (Kerr-McGee) |
| 22 | 3.0 parts of a composition comprising 40 weight percent calcium silicate, 45 weight percent calcium carbonate and 15 weight percent of 60% aqueous NaClO$_4$ solution (Kerr-McGee) |
| 23 | 1.5 parts of a composition comprising 40 weight percent calcium silicate, 35 weight percent calcium carbonate, and 25 weight percent of 60% aqueous NaClO$_4$ solution |
| 24 | 1.5 parts calcium carbonate (Atomite) |

The formulations of Examples 9–13 Examples 14–18, and Examples 19–24 were tested for stability under dynamic shear conditions by masticating at 60 rpm in the bowl of a Brabender Plastograph kept at 190° C. a 60 g quantity of each composition. After three minutes mastication, and subsequently at three minute intervals through 27 minutes and at 5 minute intervals thereafter, small samples of the composition were removed from the mixing bowl, pressed into a dime-sized button in a hand mold, and affixed to a record card.

Within each set of Examples, the results were visually examined to follow the progress of any deterioration, as evidenced by discoloration.

Degradation of Example 9, the base formulation, occurred at 32 minutes. Example 10, representing the present invention, extended the stable process time before degradation of Example 9 from 32 minutes to over 42 minutes with no sacrifice in early color content. Example 11, a control composition containing added calcium silicate only and Example 12, a control composition containing added calcium silicate and the inert of diluent calcium carbonate, each began noticeable degradation by 32 minutes, and at 37 minutes had visibly degraded to about the same extent as Example 9 had at 32 minutes. Example 13, a control composition containing added sodium perchlorate monohydrate with the inert diluent calcium carbonate at 37 minutes had visibly degraded to at least the same extent as Example 10 did at 42 minutes. Thus, none of the control compositions, Examples 11, 12 or 13, lasts as long as the present invention, Example 10, even though the total amount of additives is the same in each case.

The results of Examples 15, 16 and 17 (each representing the present invention) when compared to the results of the base formulation control, Example 14, and the added tetra sodium pyrophosphate control, Example 18, indicate the present invention relatively extends the stable process time before degradation without sacrificing early color. In particular, Example 14 reflects visible degradation at 27 minutes and substantial degradation at 32 minutes. Example 15 reflects visible degradation at 32 minutes and 37 minutes but noticeably less than that shown by Example 14 at 32 minutes. Example 18 demonstrates better performance than that for Example 14 but not as good as that for Example 15. Comparing different variations of the present invention, Example 17 demonstrates better performance, i.e. lesser visible degradation at respective times, than that for Example 15 but not as good as that for Example 16.

Degradation of Example 19, the base formulation, occurred at 32 minutes. Example 24, the control formulation containing calcium carbonate, reflected hardly different visual results from those of Example 19. Each of Examples 20–23, representing the present invention, extended the stable process time before degradation of Examples 19 and 24, without sacrificing early color. Particularly, Example 20 appeared less degraded at 37 minutes than did Example 19 at 32 minutes; Example 21 appeared visibly degraded at 37 minutes and 42 minutes but even at 42 minutes the degree of degradation appeared to be no more than that for Example 19 at 32 minutes; Example 22 did not appear to be visibly degraded until 42 minutes and at 42 minutes the degree of degradation appeared to be similar to that of Example 21 at 37 minutes; Example 23 appeared to provide very similar results as that for Example 22.

EXAMPLES 25–31

Polyvinyl chloride resin compositions were prepared having the following base formulations:

| INGREDIENT | PARTS BY WEIGHT |
|---|---|
| Polyvinyl chloride homopolymer (OXY B-282) | 100.0 |
| Diundecyl Phthalate (Exxon) | 40.0 |
| Diisodecyl Phthalate (Exxon) | 15.00 |
| Epoxidized Soy Bean Oil (Drapex 6.8) | 7.0 |
| Calcium carbonate | 10.0 |
| Stearic acid | 0.2 |
| Primary Heat Processing Stabilizer (composition comprising 60% barium stearate, 10 weight percent zinc laurate, 5 weight percent dibenzoylmethane, 5 weight percent 4,4'-isopropylidenediphenol, and 20 weight percent dry Kaolin diluent | 2.0 |

Depending upon the examples, the following components were added to the base formulation:

| EXAMPLE | PARTS BY WEIGHT ADDITION TO BASE FORMULATION |
|---|---|
| 25 | None |
| 26 | 0.6 parts composition comprising a 5 to 1 by weight blend of calcium silicate (Hubersorb 600) and 60% aqueous NaClO$_4$ solution (Kerr-McGee) |
| 27 | 1.2 parts composition comprising a 5 to 1 by weight blend of calcium silicate (Hubersorb 600) and 60% aqueous NaClO$_4$ solution (Kerr-McGee) |

-continued

| EXAMPLE | PARTS BY WEIGHT ADDITION TO BASE FORMULATION |
|---|---|
| 28 | 0.5 parts calcium silicate |
| 29 | 1.0 parts calcium silicate |
| 30 | 0.1 parts 60% aqueous NaClO$_4$ solution |
| 31 | 0.2 parts 60% aqueous NaClO$_4$ solution |

EXAMPLES 32–38

Polyvinyl chloride resin composition were prepared having the following base formulations:

| INGREDIENT | PARTS BY WEIGHT |
|---|---|
| Polyvinyl chloride homopolymer (OXY B-282) | 100.0 |
| Diundecyl Phthalate (Exxon) | 40.0 |
| Diisodecyl Phthalate (Exxon) | 15.00 |
| Epoxidized Soy Bean Oil (Drapex 6.8) | 7.0 |
| Stearic acid | 0.25 |
| Calcium carbonate (Atomite) | 10.0 |

Depending upon the example, the following components were added to the base formulation:

| EXAMPLE | PARTS BY WEIGHT ADDITION TO BASE FORMULATION |
|---|---|
| 32 | None |
| 33 | 0.2 parts 60% aqueous NaClO$_4$ solution |
| 34 | 1.0 parts 60% aqueous NaClO$_4$ solution |
| 35 | 0.2 parts 60% aqueous NaClO$_4$ solution 0.5 parts calcium silicate (Hubersorb 600) |
| 36 | 0.6 parts calcium silicate (Hubersorb 600) |
| 37 | 1.0 parts of a composition comprising 40 weight percent calcium silicate (Hubersorb 600), 45 weight percent calcium carbonate (Atomite) and 15 weight percent of 60% aqueous NaClO$_4$ solution (Kerr-McGee) |
| 38 | 1.0 parts of a composition comprising 40 weight percent calcium silicate (Hubersorb 600), 35 weight percent calcium carbonate (Atomite) and 25 weight percent of 60% aqueous NaClO$_4$ solution (Kerr-McGee) |

The formulations of Examples 25–31 and Examples 32–38 were blended on a two-roll mill, and then sheeted off.

To determine the heat processing stability, samples were cut from sheets and heated in an oven at 250° F. for up to two hours and at 375° F. for up to 80 minutes. Samples were withdrawn at fifteen minute intervals at 350° F. and at ten minute intervals at 3750° F. to follow the progress of any deterioration, as evidenced by visual discoloration and/or embrittlement.

Comparing within Examples 25–31, the compositions of the present invention, i.e. Examples 26 and 27, to the base control formulation, i.e. Example 25, and the comparison control formulations, i.e. Examples 28–31, the samples of Examples 26 and 27 are less discolored off the mill and throughout the oven test than are the respective time samples from Examples 25 and 28–31.

The base formulation for Examples 32–38 contains epoxidized soy bean oil as the only base stabilizing additive. Examples 35, 37 and 38 illustrate the present invention. Example 32 represents the base formulation control and Examples 33, 34 and 36 represent controls containing sodium perchlorate or calcium silicate as identified above. Samples from control Examples 32 and 36 were slightly discolored to an undesirable pink off the mill (time zero). Samples from Examples 35, 37 and 38 were clean off the mill (time zero) and resisted degradation to brown (a sign of objectionable cross linking) until the 60 or 75 minute chip at 350° F. and the 30 or 40 minute chip at 375° F. Samples from control Examples 33 and 34 were also clean off the mill (time zero) but degraded to brown by the 45 minute chip at 350° F. and by the 20 minute chip at 375°.

What is claimed:

1. A stabilizer composition to provide long term stability to vinyl halide compositions at moderate aging temperatures of about 180° F. to 275° F., said stabilizer composition comprising sodium perchlorate and calcium silicate.

2. The composition of claim 1 wherein the ratio of sodium perchlorate to calcium silicate is approximately 1:8 to approximately 3:4 by weight.

3. The composition of claim 1 wherein the ratio of sodium perchlorate to calcium silicate is approximately 1:5 to approximately 4:10 by weight.

4. The composition of claim 1 comprising a water solution containing approximately 60 to 75 weight percent of sodium perchlorate, wherein the ratio of said solution to said calcium silicate is approximately 1:5 to 1:1 by weight.

5. The composition of claim 4 wherein the ratio of said solution to said calcium silicate is approximately 1:3 to 5:7 by weight.

6. The composition of claim 4 wherein the ratio of said solution to said calcium silicate is about 5:8 by weight.

7. The composition of claim 4 wherein the ratio of said solution to said calcium silicate is approximately 3:8 by weight.

* * * * *